United States Patent Office 3,652,731
Patented Mar. 28, 1972

3,652,731
NEW POLYMERIC COMPOSITIONS
Gerald P. Coffey, Cleveland Heights, and Lawrence E. Ball, Cuyahoga Falls, Ohio, assignors to The Standard Oil Company, Cleveland, Ohio
No Drawing. Continuation-in-part of application Ser. No. 799,094, Feb. 13, 1969. This application Nov. 13, 1970, Ser. No. 89,504
Int. Cl. C08f 1/13, 15/16, 19/08
U.S. Cl. 260—879                 10 Claims

ABSTRACT OF THE DISCLOSURE

Impact-resistant thermoplastic polymers having low permeability to gases and vapors are prepared by polymerizing acrylonitrile with an alpha-olefin such as isobutylene, at least one member selected from the group consisting of an acrylic ester, a methacrylic ester, methacrylonitrile, an acrylamide, and a vinyl ester, and optionally another vinyl monomer component such as a vinyl aromatic monomer in an aqueous medium in the presence of a rubbery polymer of a conjugated diolefin.

---

This application is a continuation-in-part of our co-pending U.S. patent application Ser. No. 799,094, filed Feb. 13, 1969 now abandoned.

The present invention relates to novel thermoplastic polymeric compositions of good impact strength which have excellent thermal stability and low permeability to gases, and more particularly pertains to impact-resistant polymeric compositions which function as gas and vapor barrier materials and are composed of a conjugated diene monomer, acrylonitrile, an alpha-olefin, optionally another monoolefinically unsaturated monomer component such as a vinyl aromatic monomer, and at least one member selected from the group consisting of a vinyl ester, an acrylate ester, an acrylamide, methacrylonitrile, and a methacrylate ester, and to a process for preparing same.

The novel polymeric products of the present invention are prepared by polymerizing a major portion of acrylonitrile, a minor portion of an alpha-olefin such as isobutylene, and a minor portion of at least one member selected from the group consisting of a vinyl ester, an acrylate ester, an acrylamide, methacrylonitrile, and a methacrylate ester, and optionally a vinyl aromatic monomer such as styrene, in the presence of a preformed rubbery polymer composed of a conjugated diene monomer such as butadiene, and optionally a vinyl aromatic monomer such as styrene.

The conjugated diene monomers useful in the rubbery copolymer intermediates of the present invention include butadiene-1,3-isoprene, chloroprene, bromoprene, cyanoprene, 2,3-dimethyl-butadiene-1,3, 2-ethyl-butadiene-1,3, 2,3-diethyl-butadiene-1,3, and the like, and others. Most preferred for the purpose of this invention are butadiene and isoprene because of their ready availability and their excellent copolymerization properties.

The olefinically unsaturated nitriles useful in the polymeric resins of the present invention are the alpha-beta-olefinically unsaturated mononitriles having the structure

CH$_2$=C—CN
|
R wherein R is hydrogen, a lower alkyl group having from 1 to 4 carbon atoms, or a halogen. Such compounds include acrylonitrile, alpha-chloroacrylonitrile, alpha-bromoacrylonitrile, alpha-fluoroacrylonitrile, methacrylonitrile, ethacrylonitrile, and the like. The most preferred olefinically unsaturated nitriles in the present invention are acrylonitrile and methacrylonitrile and mixtures thereof.

The alpha-olefins useful in the present invention are those having at least 4 and as many as 10 carbon atoms and having the structure

wherein R' and R" are alkyl groups having from 1 to 7 carbon atoms. More specifically preferred are alpha-olefins such as isobutylene, 2-methyl butene-1, 2-methyl pentene-1, 2-methyl hexene-1, 2-methyl heptene-1, 2-methyl octene-1, 2-ethyl butene-1, 2,4,4-trimethylpentene-1 (diisobutylene), 2-propyl pentene-1, and the like. Most preferred are isobutylene, diisobutylene, and 2-methyl pentene-1.

The vinyl ester monomers useful in the present invention include vinyl acetate, vinyl propionate, the vinyl butyrates, vinyl benzoate, isopropenyl acetate, and generally vinyl esters having the formula

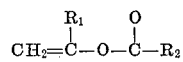

wherein R$_1$ represents hydrogen and a methyl group and R$_2$ represents a hydrocarbon group having from 1 to 8 carbon atoms. Most preferred is vinyl acetate.

The acrylate ester monomers useful in this invention include methyl acrylate, ethyl acrylate, the propyl acrylates, the butyl acrylates, the amyl acrylates, the hexyl acrylates, cyclohexyl acrylate, phenyl acrylate, the octyl acrylates, and the like. Most preferred are methyl acrylate and ethyl acrylate.

The methacrylate ester monomers useful in this invention include methyl methacrylate, ethyl methacrylate, the propyl methacrylates, the butyl methacrylates, the amyl methacrylates, the hexyl methacrylates, cyclohexyl methacrylate, phenyl methacrylate, the decyl methacrylates, and generally acrylates and methacrylates having the formula

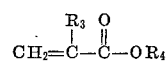

wherein R$_3$ represents hydrogen and methyl and R$_4$ is a hydrocarbon group having from 1 to 10 carbon atoms. Most preferred is methyl methacrylate.

The acrylamide monomers useful herein include acrylamide, methacrylamide, N-t-butyl acrylamide, N-(1,1,3,3-tetramethyl butyl) acrylamide, N-methyl acrylamide, N-phenyl acrylamide, N-methyl methacrylamide, N-t-butyl methacrylamide, N-vinyl benzamide, N-vinyl pyrrolidone, and diacetone acrylamide. Most preferred are acrylamide, N-t-butyl acrylamide and N-(1,1,3,3-tetramethyl butyl) acrylamide.

The vinyl aromatic monomers useful in this invention include styrene, alpha-methyl styrene, monochlorostyrenes, t-butyl styrenes, vinyl toluene, vinyl xylenes, and vinyl naphthalenes. Preferred are styrene and alpha-methyl styrene and most preferred is styrene.

The polymeric compositions of the present invention can be prepared by any of the known general techniques of polymerization including bulk polymerization, solution polymerization, and emulsion or suspension polymerization techniques by batch, continuous, or intermittent addition of the monomers and other components. The preferred method is polymerization in an aqueous medium such as emulsion or suspension polymerization. The important point in the process of this invention is that the novel polymeric products are prepared by polymerizing in an aqueous medium the acrylonitrile, the alpha-olefin, and other monomers in the presence of a preformed rubbery polymer of the conjugated diene monomer. The polymerization is preferably carried out in an aqueous medium in the presence of an emulsifier and a free-radical generating polymerization initiator at a temperature of from about 0 to 100° C. in the substantial absence of molecular oxygen.

The preferred polymeric compositions embodied herein are those resulting from the polymerization of 100 parts by weight of (A) from 70 to 85% by weight of acrylonitrile, (B) from 2 to 13% by weight of an alpha-olefin having the structure

wherein R' and R" are alkyl groups having from 1 to 7 carbon atoms, (C) from 2 to 30% by weight of at least one monovinyl monomer selected from the group consisting of a vinyl ester, an acrylate ester, an acrylamide, methacrylonitrile, and a methacrylate ester, and (D) from 0 to 17% by weight of a vinyl aromatic monomer component in the presence of from 1 to 30 parts by weight of (E) a rubbery polymer of a conjugated diene monomer selected from the group consisting of butadiene and isoprene, and optionally a vinyl aromatic monomer, said rubbery polymer containing from 50 to 100% by weight of polymerized conjugated diene and from 50 to 0% by weight of polymerized vinyl aromatic monomer. In the foregoing polymeric compositions it is to be understood that the combined amount of ingredients (A)+(B)+(C)+(D) is always 100%. It is also to be understood that in combining the ingredients (A)+(B)+(C)+(D) in no case can the minimum indicated percentages for more than two of these ingredients be employed.

More specifically, the present invention can be illustrated by the polymerization of a mixture of acrylonitrile, isobutylene, methyl acrylate, and styrene in the presence of a preformed copolymer of butadiene-1,3 and styrene to produce a thermoplastic product having excellent heat distortion properties, impact strength, and exceptionally good impermeability to gases and vapors when exposed to said gases and vapors in the form of a shaped article such as a film or thin sheet.

The rubbery copolymer of butadiene-1,3 and styrene preferably contains at least 50% by weight of combined butadiene based on the total weight of combined butadiene and styrene. More preferably, the rubbery copolymer of butadiene and styrene should contain from 50 to 100% and more preferably 60 to 100% by weight of polymerized butadiene.

In the foregoing polymerization it is most preferred that from about 10 to 30 parts of the rubbery polymer of the diene monomer be employed for each 100 parts of combined acrylonitrile, isobutylene, vinyl or acrylic ester, methacrylic ester, acrylamide monomer, methacrylonitrile, and optionally the other monovinyl monomer component. It has generally been found that as the relative amount of the rubbery polymer of the conjugated diene monomer is increased in the final polymeric product, the impact strength increases and the gas and vapor barrier properties decrease somewhat. It is generally preferred to use just enough of the rubbery polymer to impart the desired impact strength to the polymeric product and to retain the optimum gas and vapor barrier properties in the polymeric product.

The novel polymeric products of the present invention are thermoplastic materials which can be thermoformed into a wide variety of useful articles in any of the conventional ways employed with known thermoplastic polymeric materials, such as by extrusion, milling, molding, drawing, blowing, etc. The polymeric products of this invention have excellent heat distortion temperatures and solvent resistance and their impact strength and low permeability to gases and vapors make them very useful in the packaging industry, and they are particularly useful in the manufacture of bottles, film and other types of containers for liquids and solids.

In the following illustrative examples the amounts of ingredients are expressed in parts by weight unless otherwise indicated.

EXAMPLE 1

(A) A rubbery copolymer of butadiene and styrene was prepared in aqueous emulsion to form a latex. The copolymer contained about 70% butadiene and about 30% styrene. The polymerization was carried out at 150° F. and was initiated with a persulfate catalyst and about 2.5 parts of rosin acid emulsifier and fatty acid stabilizer. When the polymerization was completed at 70% conversion, the residual monomer was removed by vacuum stripping and the latex was concentrated to about 60% solids content.

(B) A copolymer resin which is within the scope of the present invention was prepared from the following recipe in emulsion:

| | Parts |
|---|---|
| Acrylonitrile | 75 |
| Isobutylene | 10 |
| Styrene | 5 |
| Methyl acrylate | 10 |
| Water | 300 |
| Emulsifier (GAFAC RE-610 [1]) | 3.0 |
| n-Dodecyl mercaptan | 0.05 |
| Potassium persulfate | 0.3 |
| Rubber latex from step A above (60% solids) | 33.3 |

[1] A mixture of R—O—(CH$_2$CH$_2$O—)$_n$PO$_3$M$_2$ and [R—O—(CH$_2$CH$_2$O—)$_n$]$_2$PO$_2$M wherein $n$ is a number of from 1 to 40, R is an alkyl or alkaryl group and preferably a nonyl phenyl group and preferably a nonyl phenyl group and M is hydrogen, ammonia or an alkali group, which composition is sold by the General Aniline and Film Corporation.

The above described mixture was placed in a polymerized reactor. The pH of the final polymerization mixture was about 7. The free space in the polymerization reactor was purged of air with a stream of purified nitrogen and the reactor was sealed. The polymerization mixture was agitated at 60° C. for 16 hours. The resulting latex was coagulated with methanol, washed with fresh methanol and dried at 45° C. at a reduced pressure for 16 hours. The yield of finely divided resin was 99 parts which is 92% of theory. The dry thermoplastic resin was compression molded in a steel cavity mold at 4,000 p.s.i. at 180 to 200° C. to yield a thermoplastic bar which had the following properties:

ASTM heat distortion temperature (264 p.s.i.)—72° C.
Notched Izod impact strength (foot pounds per inch of notch)—1.4

This resin and the others described in the following examples in the form of their firms were found to have very low water vapor transmission and very low oxygen transmission, falling in the following ranges:

Water vapor transmission (gram/mil/100 inches$^2$/24 hours)—2.5–4.0
Oxygen transmission (cc./mil/100 inches$^2$/24 hours/atmosphere)—0.4–0.9

(C) When step B was repeated without the rubber latex in the recipe, a resin was obtained which had a notched Izod impact strength of 0.25 foot pound per inch of notch.

EXAMPLE 2

The procedures of Example 1 (steps A and B) was repeated using 20 parts by weight of a polybutadiene rubber solids in latex form in place of the butadiene-styrene rubber of step A. The final thermoplastic resin when compression molded had a notched Izod impact strength of 2.4 foot pounds per inch of notch and an ASTM heat distortion temperature of 74° C.

EXAMPLE 3

Example 1 (steps A and B) was repeated except that the monomer charged in step B was acrylonitrile/styrene/N-t-octyl acrylamide [N(1,1,3,3-tetramethylbutyl) acrylamide]/isobutylene in the weight ratio of 75/5/10/10, respectively. The dried thermoplastic resin was compression molded into a test bar which was found to have a notched Izod impact strength of 3.7 foot pounds per inch of notch and an ASTM heat distortion temperature of 79° C.

EXAMPLE 4

Example 2 was repeated except that the monomer feed in step B was acrylonitrile/styrene/n-t-octyl acrylamide/isobutylene in the weight ratio of 75/5/10/10, respecitvely. The molded dry thermoplastic resin was found to have a notched Izod impact strength of 4.5 foot pounds per inch of notch and an ASTM heat distortion temperature of 78° C.

EXAMPLE 5

The procedure of Example 2 was repeated except that the monomer feed in step B was acrylonitrile/styrene/methyl acrylate/isobutylene in the weight ratio of 75/11/7/7, respectively, and 15 parts by weight of rubber per 100 parts of resin were used. The molded polymer was found to have a notched Izod impact strength of 1.0 foot pound per inch of notch and as ASTM heat distortion temperature of 76° C.

EXAMPLE 6

The procedure of Example 2 was repeated except that the monomer feed in step B was acrylonitrile/styrene/methyl acrylate/diisobutylene in the weight ratio of 75/11/7/7, respectively, and 15 parts by weight of rubber per 100 parts of final resin were employed. The molded, dried resin had a notched Izod impact strength of 1.2 foot pounds per inch of notch and an ASTM heat distortion temperature of 86° C.

EXAMPLE 7

Example 1 (steps A and B) was repeated except that the monomer feed in step B of Example 1 was acrylonitrile/styrene/N-t-butyl acrylamide/isobutylene in the weight ratio of 75/5/10/10, respectively, and 15 parts by weight of rubber per 100 parts of final resin were employed. The dried, molded resin had a notched Izod impact strength of 1.7 foot pounds per inch of notch and an ASTM heat distortion temperature of 80° C.

EXAMPLE 8

(A) Example 3 was repeated except that 15 parts of weight of rubber per 100 parts of final resin were used. The dried, molded polymer had a notched Izod impact strength of 1.2 foot pounds per inch of notch and an ASTM heat distortion temperature of 74° C.

(B) A repeat of step A of this example using polybutadiene rubber in place of the butadiene-styrene rubber gave a resin having a notched Izod impact strength of 1.1 foot pounds per inch of notch and an ASTM heat distortion temperature of 77° C.

EXAMPLE 9

Example 1 (steps A and B) was repeated except that 15 parts by weight of polybutadiene rubber were substituted for the 20 parts by weight of rubbery butadiene-styrene copolymer. The resulting resin was found to have a notched Izod impact strength of 1.2 foot pounds per inch of notch and an ASTM heat distortion temperature of 79° C.

EXAMPLE 10

The procedure of Example 1 (steps A and B) was repeated using a monomer charge in step B of acrylonitrile/methyl methacrylate/N-t-octyl acrylamide/isobutylene in the weight ratio of 75/5/10/10, respectively, and 15 parts by weight of the butadiene-styrene rubber. The resulting resin was found to have a notched Izod impact strength of 1.2 foot pounds per inch of notch and an ASTM heat distortion temperature of 78° C.

EXAMPLE 11

The procedure of Example 1 (steps A and B was followed except that the monomer charge in step B was acrylonitrile/styrene/vinyl acetate/isobutylene in the weight ratio 75/5/10/10, respectively, and 25 parts by weight of the rubber were employed. The final resin was found to have a notched Izod impact strength of 1.9 foot pounds per inch of notch.

EXAMPLE 12

The procedure of Example 11 was repeated using as the rubber 30 parts by weight of polybutadiene. The final resin was found to have a notched Izod impact strength of 2.2 foot pounds per inch of notch.

EXAMPLE 13

The procedure of Example 1 (steps A and B) was followed except that the monomer charge in step B was acrylonitrile/styrene/N-t-octyl acrylamide/isobutylene in the weight ratio of 79/7/7/7, respectively, and 20 parts by weight of the rubber were used. The resulting resin was found to have a notched Izod impact strength of 1.9 foot pounds per inch of notch.

EXAMPLE 14

The procedure of Example 13 was repeated with the exception that polybutadiene was used as the rubber. The resulting resin was found to have a notched Izod impact strength of 2.4 foot pounds per inch of notch.

EXAMPLE 15

The procedure of Example 1 (steps A and B) was followed using a monomer charge in step B of acrylonitrile/styrene/N-t-octyl acrylamide/isobutylene in the weight ratio of 81/5/7/7, respectively, and 20 parts by weight of rubber. The resulting resin was found to have a notched Izod impact strength of 2.0 foot pounds per inch of notch.

We claim:

1. The polymeric composition resulting from the polymerization in an aqueous medium of
    (A) from 70 to 85% by weight of acrylonitrile, and
    (B) from 2 to 13% by weight of an alpha-olefin having the structure

wherein R′ and R″ are alkyl groups having from 1 to 7 carbon atoms, and
    (C) from 2 to 30% by weight of at least one monovinyl monomer selected from the group consisting of a vinyl ester, an acrylate ester, an acrylamide, methacrylonitrile, and a methacrylate ester, and
    (D) from 0 to 17% by weight of a vinyl aromatic monomer component
    wherein the combined amount of (A)+(B)+(C)+(D) is always 100% in the presence of from 1 to 30 parts by weight per 100 parts by weight of (A)+(B)+(C)+(D) of
    (E) a rubbery polymer of a conjugated diene monomer selected from the group consisting of butadiene and isoprene, and optionally a vinyl aromatic monomer, said rubbery copolymer containing from 50 to 100% by weight of polymerized conjugated diene monomer and from 50 to 0% by weight of polymerized vinyl aromatic monomer.

2. The composition of claim 1 wherein the alpha-olefin is isobutylene.

3. The composition of claim 1 wherein the alpha-olefin is 2-methyl pentene-1.

4. The composition of claim 1 wherein the alpha-olefin is 2-methyl butene-1.

5. The composition of claim 2 wherein the alpha-olefin is diisobutylene.

6. The process comprising polymerizing in an aqueous medium in the presence of an emulsifier and a freeradical generating polymerization initiator at a temperature of from about 0 to 100° C. in the substantial absence of molecular oxygen a mixture of
(A) from 70 to 85% by weight of acrylonitrile, and
(B) from 2 to 13% by weight of an alpha-olefin having the structure

wherein R′ and R″ are alkyl groups having from 1 to 7 carbon atoms, and
(C) from 2 to 30% by weight of at least one monovinyl monomer selected from the group consisting of a vinyl ester, an acrylate ester, an acrylamide, methacrylonitrile, and a methacrylate ester, and
(D) from 0 to 17% by weight of a vinyl aromatic monomer component
wherein the combined amount of (A)+(B)+(C)+(D) is always 100% in the presence of from 1 to 30 parts by weight per 100 parts by weight of combined (A)+(B)+(C)+(D) of
(E) a rubbery polymer of a conjugated diene monomer selected from the group consisting of butadiene and isoprene, and optionally a vinyl aromatic monomer, said rubbery copolymer containing from 50 to 100% by weight of polymerized conjugated diene monomer and from 50 to 0% by weight of polymerized vinyl aromatic monomer.

7. The process of claim 6 wherein the alpha-olefin is isobutylene.
8. The process of claim 6 wherein the alpha-olefin is 2-methyl pentene-1.
9. The process of claim 6 wherein the alpha-olefin is 2-methyl butene-1.
10. The process of claim 6 wherein the alpha-olefin is diisobutylene.

References Cited

UNITED STATES PATENTS

| | | | |
|---|---|---|---|
| 2,857,339 | 10/1958 | Colwell | 260—2.5 |
| 3,451,538 | 6/1969 | Trementozzi | 206—46 |
| 3,476,831 | 11/1969 | Daumiller et al. | 260—879 |
| 3,580,974 | 5/1971 | Lee et al. | 260—876 R |

JOSEPH L. SCHOFER, Primary Examiner

R. A. GAITHER, Assistant Examiner

U.S. Cl. X.R.

260—880